(12) United States Patent
Scholz et al.

(10) Patent No.: US 10,809,354 B2
(45) Date of Patent: Oct. 20, 2020

(54) METHOD FOR DETERMINING A POSITION AND/OR ORIENTATION OF A SENSOR

(71) Applicant: s.m.s. smart microwave sensors GmbH, Braunschweig (DE)

(72) Inventors: Alexander Scholz, Braunschweig (DE); Ralph Mende, Braunschweig (DE)

(73) Assignee: S.M.S. SMART MICROWAVE SENSORS GMBH, Braunschweig (DE)

(*) Notice: Subject to any disclaimer, the term of this patent is extended or adjusted under 35 U.S.C. 154(b) by 156 days.

(21) Appl. No.: 15/329,291

(22) PCT Filed: Jul. 28, 2015

(86) PCT No.: PCT/EP2015/001548
§ 371 (c)(1),
(2) Date: Jan. 26, 2017

(87) PCT Pub. No.: WO2016/015857
PCT Pub. Date: Feb. 4, 2016

(65) Prior Publication Data
US 2017/0248689 A1 Aug. 31, 2017

(30) Foreign Application Priority Data

Jul. 28, 2014 (DE) .................. 10 2014 010 937

(51) Int. Cl.
*G01S 7/40* (2006.01)
*G01S 13/91* (2006.01)
(Continued)

(52) U.S. Cl.
CPC ............ *G01S 7/4026* (2013.01); *G01S 13/91* (2013.01); *G08G 1/01* (2013.01); *G08G 1/04* (2013.01)

(58) Field of Classification Search
CPC ............................. G01S 7/4026; G01S 13/91
See application file for complete search history.

(56) References Cited

U.S. PATENT DOCUMENTS

| 4,866,438 A | * | 9/1989 | Knisch | G01S 13/92 |
| | | | | 340/936 |
| 5,935,190 A | * | 8/1999 | Davis | G01S 13/62 |
| | | | | 701/119 |

(Continued)

FOREIGN PATENT DOCUMENTS

| DE | 102011050660 A1 | 11/2012 |
| DE | 102013002994 A1 | 9/2014 |

(Continued)

OTHER PUBLICATIONS

Meysam Argani et al.: "A GIS Based Wireless Sensor Network Coverage Estimation and Optimization: A Voronoi Approach", Jan. 1, 2011, Transactions on Computational Science XT/, Springer, pp. 151-172. (Year: 2011).*

(Continued)

*Primary Examiner* — Marcus E Windrich
(74) *Attorney, Agent, or Firm* — W & C IP

(57) ABSTRACT

The intended position and/or an intended alignment of at least one sensor for monitoring traffic at a traffic route is determined easily, quickly and reliably with the aid of computer technology. The methodology employed involves identification of a traffic route to be monitored in a data processing device, and requesting and providing data about the traffic route from a database. From this, at least one possible target position and/or target orientation is determined from the provided data. The methodology avoids the need to manually enter lanes and other local conditions of the traffic route. Instead, the data processing device recalls the required traffic data from a database, and based on manipulation of a graphical representation of the sensor by (Continued)

the user with the aid of the provided data and specified sensor characteristics an intended position and/or intended alignment of a sensor can be visualized and stored for later use during installation.

4 Claims, 1 Drawing Sheet

(51) Int. Cl.
*G08G 1/04* (2006.01)
*G08G 1/01* (2006.01)

(56) References Cited

U.S. PATENT DOCUMENTS

| | | | | |
|---|---|---|---|---|
| 7,889,097 | B1* | 2/2011 | Arnold | G01S 13/42 |
| | | | | 340/907 |
| 9,197,866 | B2* | 11/2015 | Messely | G01S 7/2955 |
| 9,235,988 | B2* | 1/2016 | Mimeault | G08G 1/015 |
| 9,378,640 | B2* | 6/2016 | Mimeault | G01S 7/4802 |
| 9,865,933 | B2* | 1/2018 | Scheschko | H01Q 15/18 |
| 2006/0247844 | A1* | 11/2006 | Wang | G08G 1/01 |
| | | | | 701/117 |
| 2007/0096943 | A1* | 5/2007 | Arnold | G08G 1/08 |
| | | | | 340/907 |
| 2007/0222639 | A1* | 9/2007 | Giles | G08G 1/07 |
| | | | | 340/907 |
| 2010/0141479 | A1* | 6/2010 | Arnold | G08G 1/01 |
| | | | | 340/936 |
| 2010/0149020 | A1* | 6/2010 | Arnold | G01S 13/91 |
| | | | | 342/90 |
| 2013/0151135 | A1* | 6/2013 | Aubrey | G08G 1/0116 |
| | | | | 701/118 |
| 2013/0286198 | A1* | 10/2013 | Fan | G06K 9/00785 |
| | | | | 348/143 |
| 2016/0142679 | A1* | 5/2016 | Miyoshi | H04N 7/181 |
| | | | | 348/159 |

FOREIGN PATENT DOCUMENTS

| | | |
|---|---|---|
| IE | 102008016311 A1 | 11/2008 |
| JP | 2004-165790 A | 6/2004 |
| JP | 2015-230580 A | 12/2015 |
| KR | 10-2010-00096519 A | 9/2010 |

OTHER PUBLICATIONS

Meysam Argani et al.: "A GIS Based Wireless Sensor Network Coverage Estimation and Optimization: A Voronoi Approach", Jan. 1 2011, Transactions on Computational Science;XT/, Springer, pp. 151-172. (Year: 2011).*

Lieswyn et al.; "Automatic Cycle Counting Programme Development in Hamilton"; IPENZ Transportation Group Conference Auckland, Mar. 1, 2011, pp. 0-10.

Argany et al.; "A GIS Based Wireless Sensor Network Coverage Estimation and Optimization: A Voronoi Approach"; Transactions on Computational Science XIV, Jan. 1, 2011, pp. 151-172.

Lubczonek et al.; "Aspects of spatial planning of radar sensor network for inland waterways surveillance"; Proceedings of the 6th European Radar Conference, Sep. 30, 2009, pp. 501-504.

Caiti et al.; "GIS-Based Performance Prediction and Evaluation of Civilian Harbour Protection Systems"; Oceans 2007—Europe, Jun. 1, 2007, pp. 1-6.

Yang, Xiaomin, "Research on vehicle detection technology based on LFMCW millimeter wave radar", China Master's Thesis Full-text Database (electronic journal), engineering technology, vol. 1, 2008, pp. 6-9, Jan. 12, 2008.

* cited by examiner

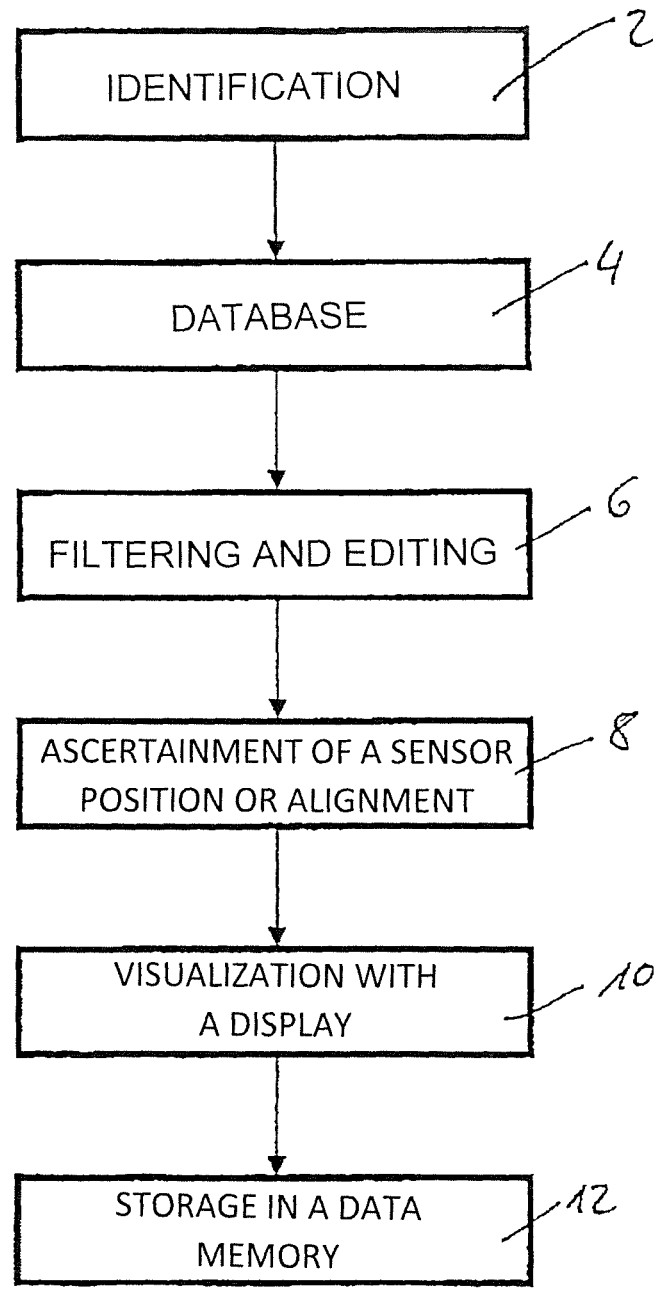

METHOD FOR DETERMINING A POSITION AND/OR ORIENTATION OF A SENSOR

BACKGROUND OF THE INVENTION

Field of the Invention

The invention relates to a method for determining an intended position and/or an intended alignment of at least one sensor for monitoring the traffic on a traffic route.

Background Description

These days, such sensors have been known for a long time from the prior art and are used, for example, for monitoring traffic at busy traffic routes, for example crossings. In principle, the sensors may, however, also be used for monitoring shipping routes, for example canals or locks, or for monitoring rail transport routes. Conventionally, a transmission device of the sensor emits transmission radiation, which maybe, for example, radar radiation. At least some of this emitted transmission radiation is reflected by traffic participants situated on the monitored part of the traffic route and then impinges on a reception device of the sensor. As a result, some of the reflected transmission radiation may be received, and so the position and the velocity of the traffic participant from which the emitted transmission radiation was reflected may be deduced.

In order, for example, to be able to monitor crossroads with, possibly, a plurality of lanes for each driving direction in an ideal manner, a plurality of such conventional sensors are required in many cases. In order to have to use as few as possible and also be able to cover the part of the traffic route to be monitored as ideally as possible, for example using only one sensor, the ideal intended positions and intended alignments of these sensors are ascertained, for example by a three-dimensional model of the traffic route to be monitored.

These days, the sensors are able to monitor the traffic on the traffic route in a multifaceted manner. Thus, for example, the number and the driving direction of the ascertained vehicles and, of course, the speed thereof may be recorded for statistical purposes. To the extent that the number and the course of the lanes and the main driving direction along this lane are known, it is also possible, for example, to ascertain drivers on the wrong carriageway. However, to this end, the sensor requires access to data about the traffic route to be monitored thereby, such as for example, course, width and number of lanes and the main driving directions along these lanes. Moreover, said sensor requires information items about the position of the sensor and the alignment relative to the lanes. Currently, all these information items are stored manually in a data memory of the sensor. By way of example, this is brought about by virtue of an aerial image of a crossroads or of part of the traffic route to be monitored being used in order, for example, to manually trace the limiting line of the lanes to be identified and thus store position and number of the lanes in the data memory of the sensor. However, a difficulty often arising here is that, for example, aerial images are often distorted since they do not correspond to a 100% vertical view. Moreover, the information items about the lanes should be stored in the sensor so that the latter may assign vehicles detected thereby to one or more of the lanes. However, this is only possible if information items about the intended position and the intended alignment in which the sensor is situated relative to the lanes are stored in the data memory of the sensor. This may often only be ascertained when inspecting the traffic route to be monitored.

SUMMARY OF THE INVENTION

The invention is therefore based on the problem of providing a method for determining an intended position and/or an intended alignment of at least one sensor for monitoring the traffic at a traffic route which can be carried out easily, quickly and reliably.

The invention solves the problem addressed by a generic method comprising the following steps:
a) providing information items in a data processing device for identifying the traffic route to be monitored,
b) querying and providing data from a database in relation to the traffic route to be monitored,
c) ascertaining at least one possible intended position and/or intended alignment with the aid of the provided data.

Compared to the methods known previously from the prior art, such a method has a multiplicity of advantages. The user wishing to determine an ideal intended position and/or intended alignment of at least one sensor must initially provide information items in a data processing device for identifying the traffic route to be monitored. Advantageously, these information items comprise, for example, at least one name of one of the involved traffic routes. However, the specification of geographic coordinates (latitude, longitude) is also possible. In this way, it is possible, for example, to uniquely identify a crossroads to be monitored by naming the two crossing roads. In a configuration of the method which is particularly simple for the person carrying out the method, aerial images or digital maps are already stored in the data processing device such that the user of the method clicks onto a specific position of such a graphically depicted map or a displayed aerial image by means of a pointer appliance, for example a mouse. Advantageously, the individual geographic coordinates of different points illustrated on the aerial image or the digital map are stored in the data memory of the data processing device such that the information items for identifying the traffic route to be monitored may be provided in this manner.

The traffic route is identified from the input information items by processing the information items in the data processing device. Here, for example, a database search is carried out, by means of which the data and information items required for identifying the traffic route are extracted from the entered information items. This may occur locally in the data processing device or by accessing an external database or data processing program. How the processing of the entered information items is carried out in detail to a great extent depends on the information items and data formats which are required by the database accessed in the second method step.

If the traffic route to be monitored is uniquely identified in the data processing device, the data processing device, in particular, accesses a database. This database may be located in a local data memory of the data processing device or, for example, in a network, for example the World Wide Web. Stored in the database are, in particular, position data and traffic guidance data about the traffic route to be monitored. These are provided for further processing on account of the query by the data processing device.

After preparing and processing the data from the database provided thus, which may be necessary, at least one possible intended position and/or intended alignment is ascertained with the aid of these provided data.

Consequently, the user of the method no longer needs to manually enter lanes and other local conditions of the traffic route to be monitored into the data processing device, as was conventional in the prior art. Instead, it is only necessary to identify the traffic route to be monitored such that the data processing device itself may recall the required traffic data from the database. As a result of this, the method is greatly accelerated on the one hand and, on the other hand, the accuracy is increased and the error susceptibility is reduced. Particularly in the case where the user of the method does not know the traffic route to be monitored from personal inspection, the uncertainty when entering, for example, driving directions manually connected therewith is reduced or completely lifted as a result of monitored and controlled data, for example, being contained in the database. As a result, the error susceptibility is reduced and hence the traffic safety is increased.

The possible intended position and/or intended alignment may be ascertained in very different ways with the aid of the provided data. One option consists of graphically depicting the provided data and manually ascertaining the desired positions, optionally with the beam lobes of the individual transmitters and/or receivers to be achieved. Naturally, it is also possible to let this method step be carried out by, for example, a computer. To this end, it is possible to formulate conditions which the intended position and/or intended alignment of the respective sensor must satisfy. This may be a minimum and/or maximum size and/or length of the region to be monitored, a minimum number of sensors, or other conditions. The computer may ascertain the desired intended positions and/or intended alignments from the data made available thereto about possible positions and/or alignments of a sensor and, optionally, from information items about technical data and beam lobe forms of the sensor. However, it is expressly highlighted that this merely is an advantageous configuration but is not necessary for carrying out the method. Manually ascertaining the intended position and/or intended alignment is also expressly included in a method according to the invention.

A sensor whose intended position and/or intended orientation is intended to be determined using a method described here may, in the process, have very different embodiments. So-called "standalone" sensors which, in addition to a transmitter and receiver for transmission radiation, which, for example, may be radar radiation, also contain an electronic data processing element and which process the data ascertained by the sensor further are known. Alternatively, or additionally, it is also possible to use sensors which, for example, are merely able to detect vehicles or other traffic participants but are not able to process the obtained data further. Typically, the traffic monitoring at a cross roads comprises, for example, a multiplicity of such sensor heads which communicate with a central data processing device. The sensor heads, the intended position and/or intended alignment of which may be determined using the method described here, collect data about traffic participants and forward these to a crossroads control appliance, which forms the central system. The methods described here are not restricted to a specific sensor form or functionality of the individual sensors. It is possible to undertake the data processing completely in the sensor or completely in the central data processing device. However, it is also possible to run only some of the algorithms required for the data processing in the sensor or in the sensor head, with the data already pre-edited thus being subsequently forwarded to a central data processing appliance, for example a so-called TMIB ("Traffic Management Interface Board"). Here, it is possible to account for the different requirements of the various algorithms. Algorithms which may be run with a relatively small amount of data on a chip with relatively little power may, for example, be carried out in the sensor or in the sensor head while algorithms which have to process large amounts of data, for example in real time, or which require much random access memory are advantageously run in the central data processing apparatus. The intended position and/or intended alignment may be determined with the method described here, independently of the selected sensor variant.

In a preferred configuration, the at least one intended position and/or intended alignment, which was ascertained using the described method, is subsequently depicted on a display or any other indication device. This is particularly preferably carried out on the basis of an aerial image or a map of the traffic route to be monitored, in which the intended position of the at least one sensor is plotted. Particularly preferably, it is also possible to depict a monitored region, in which the sensor is able to monitor the traffic, such that the user of the method may easily and unambiguously check whether the region of the traffic route of interest to him is able to be monitored by the at least one sensor in the possible intended position and/or intended alignment.

Advantageously, the data provided by the database contain information items about a structure of the traffic route, for example lanes of the traffic route, in particular the number thereof and the respective main driving direction, stop lines, pedestrian crossings and/or turning lanes. Here, these comprise, in particular, the position of the elements of the traffic route which form the structure. Alternatively, or in addition thereto, information items about the course of at least one of the lanes of the traffic route and, for example, the width thereof are contained in the provided data. All of these information items may be used to obtain the intended position and/or intended alignment, which is as ideal as possible, of the at least one sensor. By way of example, this may be brought about by virtue of boundary conditions being defined, with what region of the traffic route being monitored in respect of what, for example, emerging therefrom. By way of example, a different positioning and alignment of the at least one sensor is possibly required if the interest only lies in statistically capturing the number of trucks in one lane than if, for example, a crossing of two bicycle lanes should be monitored. A cyclist has a significantly different reflection signature of the emitted transmission radiation than is had, for example, by a truck. Naturally, this has an influence on the ideal position and alignment of the sensor and possibly on the type of the selected sensor as well.

Therefore, it is advantageous if, in addition to the information items about the traffic route to be monitored, information items about the sensor to be employed, for example transmission and reception beam lobe, maximum range and other information items of interest, are entered into the data processing device.

Preferably, information items about the structural conditions on, at and around the traffic route to be monitored are contained in the provided data recalled from the database. By way of example, these may be houses and buildings, but also illumination or traffic light posts, electrification posts for example for streetcars, or traffic signs. The more detailed information in respect of these structural conditions along and around the traffic route is provided by the data provided by the database, the better an ideal intended position and/or intended alignment of the at least one sensor may be ascertained. It is therefore no longer necessary to ascertain the positions at which sensors may even be positioned, for example by way of an inspection of a traffic crossing, as these information items may now easily be downloaded from the database.

Consequently, a capture region of the at least one sensor in which the sensor is able to monitor the traffic on the traffic route when it is arranged in the intended position and/or with the intended alignment is advantageously determined for the purposes of ascertaining the at least one intended position and/or intended alignment. Optionally, this may be ascertained using an iterative method in which, initially, a trial position and/or trial alignment of the sensor is assumed and a capture region is subsequently determined, which capture region may be ascertained in this trial position and trial alignment for the predetermined sensor. If the optionally predetermined boundary conditions are not achieved thereby, the trial position and/or trial alignment is modified using routines which, as a matter of principle, are known from the prior art and the capture region is newly determined. This is carried out iteratively until all predetermined boundary conditions are satisfied for the ideal intended position and/or intended alignment. Naturally, such an optimization may also be carried out in relation to further parameters, for example the type of sensor to be selected, the transmission or reception lobe thereof, or the type of the emitted transmission beams.

Advantageously, an intended alignment contains an intended elevation angle and an intended azimuth angle, with the elevation angle specifying an angle of inclination, for example, in relation to the horizontal or, to the extent that this is known, to the direction of the course of the traffic route, while the azimuth angle specifies, for example, an angle in relation to a certain cardinal direction, for example, to the north.

Advantageously, a plurality of intended positions and/or intended alignments are determined for a plurality of sensors. In this way, it is also possible to monitor large crossroads and other large traffic routes in a manner which is ideal and corresponding to the constraints to be specified. Here, the iterative procedure may either be carried out individually and in succession for each sensor or be carried out at the same time for the entire traffic route to be monitored. In this case, it is also possible, for example, to optimize the number of employed sensors and use this as a variational parameter.

The invention moreover solves the problem addressed by a method for configuring a sensor for monitoring the traffic on a traffic route, wherein the sensor comprises a data memory or has access to a data memory, said method being characterized in that information items about the traffic route, the intended position and/or the intended alignment are stored in the data memory of the sensor after carrying out a method as described here. In this way, an electric controller of the sensor may access all important data from the data memory, such as, for example, course, width and number of lanes, preferred driving direction and position and alignment of the sensor relative to these lanes. Since the required information was extracted from the data which were queried from the database, this method may be carried out quickly, easily and cost-effectively and, nevertheless, reliably. An inspection of the traffic route or a manual transfer of the data is no longer necessary.

Therefore, advantageously, the stored information items contain data about the course and/or number and/or main driving direction of at least one lane of the traffic route to be monitored.

A possible database which is suitable for the method in accordance with the exemplary embodiments of the present invention is the so-called "OSM" database (OSM denoting "open street map"). By way of example, it is available on the Internet in a freely accessible manner, as a result of which the method is simplified further, the method costs are reduced and the method is available virtually worldwide. However, use could also be made of other databases, such as, for example, "Nokia maps", "Google maps" or "Microsoft maps". Accordingly, it is advantageous if the data provided in method step b) may be present in this standard data format and may accordingly be easily processed further.

BRIEF DESCRIPTION OF THE DRAWING

An exemplary embodiment of the present invention is explained in more detail below with the aid of the attached drawing. In the drawing:

FIG. 1 shows a schematic flow chart of the method using the first exemplary embodiment of the present invention.

DETAILED DESCRIPTION THE INVENTION

Initially, there is identification 2 of the traffic route to be monitored. Here, information items of the data processing device are provided in a first method step, the traffic route to be monitored or the part of the traffic route to be monitored being able to be identified uniquely from said information items. The information items about the traffic route identified thus are subsequently transmitted to a database 4, from which information items about the traffic routes to be monitored or the traffic route to be monitored are queried and provided. These data are subjected to filtering and editing 6 in the next method step. By way of example, this is necessary when using the "open street map" database because the data are not available in the desired format.

Subsequently, there is ascertainment 8 of a possible intended position and/or intended alignment. A multiplicity of individual method steps may be contained in this method step. Thus, use may be made of iterative methods in order to find the ideal intended position and intended alignment for the ideal number of required sensors. Here, in particular, entered and predetermined boundary conditions are used as criteria as these need to be observed.

Subsequently, there is a visualization 10 of the at least one intended position and/or intended alignment, for example on a display or any other indication device. By way of example, this may be brought about by virtue of ascertained capture regions being depicted in a manner superposed on an aerial image or a map. This allows a user to particularly easily identify what region of the traffic route is monitored by which one of the optionally plurality of sensors and whether all boundary conditions which are of interest to the user are observed and satisfied. Subsequently, there is storage 12 in a data memory of the sensor of the data and information items about intended position and intended alignment and the required information items about the part of the traffic route to be monitored. Hence, the sensor is equipped with all information items required to ensure the full functionality and capability of the sensor.

LIST OF REFERENCE SIGNS

2 Identification
4 Database

6 Filtering and editing
8 Ascertainment
10 Visualization
12 Storage

The invention claimed is:

1. A method for determining an intended orientation of at least one sensor for monitoring the traffic on a traffic route, wherein the method comprises the following steps:
   a) providing by a user geographic coordinates or street names or street intersections to a data processing device for identifying the traffic route to be monitored or part of the traffic route to be monitored,
   b) providing to the user data from a database in relation to a structure of the traffic route to be monitored or part of the traffic route to be monitored, said data including a number of lanes in the traffic route and a respective driving direction for lanes in the traffic route,
   c) specifying by the user characteristics of said at least one sensor comprising one or more of transmission beam lobe, reception beam lobe, and maximum range,
   d) determining using the data processing device said at least one possible intended orientation of the at least one sensor based on manipulation of a graphical representation of the sensor by the user with the aid of the provided data and specified sensor characteristics, and consideration of a capture region of the at least one sensor, wherein the at least one sensor is able to monitor traffic on the traffic route in said capture region if said sensor is arranged in the at least one possible intended orientation,
   e) displaying the at least one possible intended orientation to the user, and
   f) storage in a memory the at least one possible intended orientation of the at least one sensor determined in the determining step.

2. The method as claimed in claim 1 wherein the provided data contain information items about a course of at least one lane of the traffic route.

3. The method of claim 1 wherein at least one of the information items in the data processing device and the data in the database contain data about the course and/or number and/or main driving direction of at least one lane of the traffic route.

4. The method of claim 1 wherein the structure of the traffic route includes one or more of number and main driving direction, stop lines, pedestrian crossings and/or turning lanes.

\* \* \* \* \*